US010437859B2

(12) United States Patent
Jing et al.

(10) Patent No.: US 10,437,859 B2
(45) Date of Patent: Oct. 8, 2019

(54) ENTITY PAGE GENERATION AND ENTITY RELATED SEARCHING

(71) Applicants: MICROSOFT TECHNOLOGY LICENSING, LLC, Redmond, WA (US); Kun Jing, Redmond, WA (US); Haoyong Zhang, Redmond, WA (US); Xiaosong Yang, Redmond, WA (US); Jian Li, Redmond, WA (US); Shuang Peng, Redmond, WA (US)

(72) Inventors: Kun Jing, Redmond, WA (US); Haoyong Zhang, Redmond, WA (US); Xiaosong Yang, Redmond, WA (US); Jian Li, Redmond, WA (US); Shuang Peng, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 241 days.

(21) Appl. No.: 15/115,505

(22) PCT Filed: Jan. 30, 2014

(86) PCT No.: PCT/CN2014/071845
§ 371 (c)(1),
(2) Date: Jul. 29, 2016

(87) PCT Pub. No.: WO2015/113306
PCT Pub. Date: Aug. 6, 2015

(65) Prior Publication Data
US 2017/0011112 A1    Jan. 12, 2017

(51) Int. Cl.
G06F 17/30    (2006.01)
G06F 16/28    (2019.01)
(Continued)

(52) U.S. Cl.
CPC .......... *G06F 16/285* (2019.01); *G06F 16/951* (2019.01); *G06F 16/958* (2019.01)

(58) Field of Classification Search
CPC ........... G06F 17/30598; G06F 17/3089; G06F 17/30864; G06F 16/285; G06F 16/958; G06F 16/951
See application file for complete search history.

(56) References Cited

U.S. PATENT DOCUMENTS 6,430,558 B1 * 8/2002 Delano ............. G06F 17/30864
8,005,842 B1    8/2011 Pasca et al.
(Continued)

OTHER PUBLICATIONS

Singhal, Amit, "Introducing the Knowledge Graph: Things, not Strings" Published on : May 16, 2012, Available at : http://googleblog.blogspot.in/2012/05/introducing-knowledge-graph-things-not.html, 11 pages.
(Continued)

*Primary Examiner* — Jared M Bibbee
(74) *Attorney, Agent, or Firm* — Shook, Hardy & Bacon LLP (57) ABSTRACT

Entity pages are created that are optimized for search engines to return entity information from the entity pages in response to search queries. An entity page may be created for an entity by identifying electronic content sources that include data about the entity. Usage data indicative of how users have consumed data at the electronic content sources is also determined. The usage data is analyzed to identify topics for the entity and topic content is retrieved from the electronic content sources to create topic summaries. An entity page with the topics summaries is generated. When a search engine receives a search query related to the entity, the search engine may provide information from the entity page in response to the search query.

15 Claims, 8 Drawing Sheets

(51) Int. Cl.
*G06F 16/951* (2019.01)
*G06F 16/958* (2019.01)

(56) References Cited

U.S. PATENT DOCUMENTS

| | | | |
|---|---|---|---|
| 8,195,637 B1 | 6/2012 | Datar et al. | |
| 8,229,960 B2 | 7/2012 | Nie et al. | |
| 8,504,490 B2 | 8/2013 | Nie et al. | |
| 8,504,583 B1 * | 8/2013 | Ke | G06F 16/9535 707/767 |
| 8,533,761 B1 | 9/2013 | Sahami et al. | |
| 9,565,078 B1 * | 2/2017 | Smith | H04L 43/04 |
| 2008/0134043 A1 * | 6/2008 | Georgis | G06F 17/30035 715/733 |
| 2009/0012926 A1 * | 1/2009 | Ishikawa | G06F 17/30654 706/47 |
| 2009/0043749 A1 * | 2/2009 | Garg | G06F 17/30672 |
| 2009/0327268 A1 * | 12/2009 | Denney | G06F 17/30053 |
| 2011/0307483 A1 | 12/2011 | Radlinski et al. | |
| 2012/0054687 A1 | 3/2012 | Kawabata | |
| 2012/0117475 A1 * | 5/2012 | Lee | G06Q 10/10 715/733 |
| 2012/0173626 A1 * | 7/2012 | Reis | G06Q 30/0241 709/204 |
| 2013/0110823 A1 * | 5/2013 | Su | G06F 17/30867 707/723 |
| 2013/0239024 A1 * | 9/2013 | Lewis | H04N 7/147 715/756 |
| 2013/0246435 A1 | 9/2013 | Yan et al. | |
| 2013/0262460 A1 * | 10/2013 | Barlin | G06F 17/30867 707/733 |
| 2013/0332438 A1 * | 12/2013 | Li | G06F 17/30867 707/706 |
| 2014/0201178 A1 * | 7/2014 | Baecke | G06F 16/48 707/706 |
| 2014/0358916 A1 * | 12/2014 | Anand | G06F 17/30991 707/732 |
| 2017/0103343 A1 * | 4/2017 | Yee | G06N 99/005 |
| 2018/0025010 A1 * | 1/2018 | Ramer | H04L 67/306 |

OTHER PUBLICATIONS

International Preliminary Report on Patentability dated Aug. 11, 2016 for International Patent Application No. PCT/US2014/071845, 6 pages.

* cited by examiner

ENTITY PAGE GENERATION AND ENTITY RELATED SEARCHING

CROSS-REFERENCE TO RELATED APPLICATIONS

This application claims priority under 35 U.S.C. § 365 to PCT/CN2014/071845, filed on Jan. 30, 2014, entitled "Entity Page Generation and Entity Related Searching," the entirety of which is incorporated by reference herein.

BACKGROUND OF THE INVENTION

Users are often searching for information regarding different entities. An entity may be any instance of a concept or object, such as a person, location, business, movie, product and the like. A variety of sources of information about entities are available on the Internet. For instance, users can turn to online encyclopedia or wiki sites, question and answer sites, social networking services, and product/business review/recommendation sites to find desired entity information.

While these online locations typically serve as great resources, they individually present some drawbacks. For instance, while online encyclopedia and wiki sites provide detailed information regarding entities, the information is not always optimized for users, requiring users to search through the information to find desired information. Question and answer sites allow users to enter questions and a community of users to provide answers to the user questions. However, this requires a user submitting a question to wait for answers to be submitted by answerers. Additionally, the quality of the answers may depend on the community of answerers. Users may also post questions via social networking services to other users within their social networks. Like question and answer sites, the user must wait for a response from other users. Additionally, the question may only be sent to users within that person's social network, limiting the ultimate knowledge base that may answer the user's question. When users are searching for product or business information, the users may sometimes turn to product sites or business review sites for information. These sites typically have limited information, though, and may not address the user's specific interest or may require the user to search through the site to find desired information.

Search engines are also available to assist users in searching for entity information. For instance, a user may employ a search engine to search for entity information by entering a search query related to the entity. In response to the user's search query, the search engine may provide a listing of search results, which may include information from some of the content sources noted above. However, these content sources are not always optimized for search. As a result, users typically have to sift through the search results to find desired information. In some cases, a search engine may maintain a database of entity information and provide specific entity information regarding an entity with search results returned in response to a user's search query. However, the entity information provided by the search engine may not address the user's interest.

SUMMARY OF THE INVENTION

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to generating entity pages that are optimized for search engines to provide relevant entity information in response to search queries. Content sources for an entity may be identified. Usage data regarding how users have consumed data at the content sources may also be determined. The usage data may include search queries submitted by users that resulted in search results directed to the content sources and/or user selections of search results directed to the content sources. The usage data may further include questions and comments regarding the entity submitted by users at the content sources. The usage data may be employed to identify topics for the entity, and topic summaries may be generated for the topics using content from the content sources. An entity page may be generated with the topic summaries. When search queries are received that are related to the entity, information from the entity page may be provided in response to the search queries.

BRIEF DESCRIPTION OF THE DRAWING

The present invention is described in detail below with reference to the attached drawing figures, wherein.

DETAILED DESCRIPTION OF THE INVENTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As discussed previously, there are a number of online locations that serve as content sources for various entities (e.g., people, locations, businesses, movies, products and the like). These content sources include, for instance, online encyclopedias or wiki sites (e.g., the WIKIPEDIA site), question and answer sites (e.g., the YAHOO ANSWERS site), social networking services (e.g., the FACEBOOK and TWITTER services), product shopping and/or review sites (e.g., the YELP site), and an entity's website. However, each of these content sources individually present drawbacks. Additionally, the content sources are only loosely coupled to search engines that may be used to search them, and the content sources are not typically optimized for search. Therefore, although users can employ search engines to search for information from the content sources, the search results returned may not quickly address what aspects of entities users are searching. As a result, users typically need to sift through the returned search results to find desired information.

Figure 2:
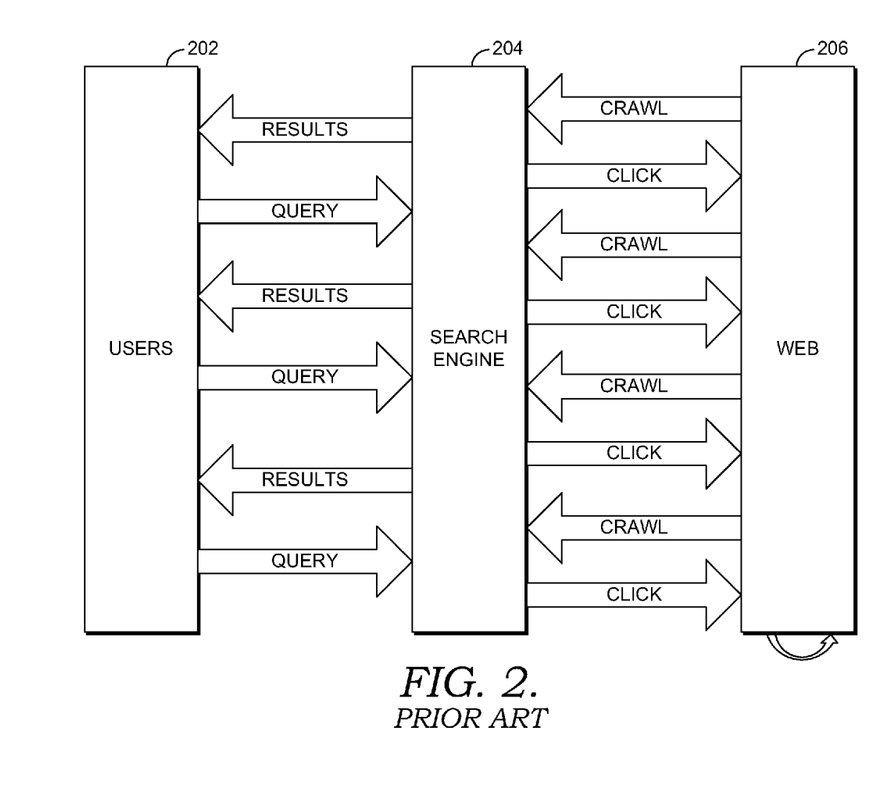
FIG. 2 is a diagram illustrating layers in a typical search engine service.

Embodiments of the present invention are directed to a search engine providing entity pages that provide entity information designed around how users consume data about entities to better address user searches for entity information. As shown in FIG. 2, a typical search engine model can be viewed as having three layers: a user layer 202 in which users submit search queries to a search engine, a web layer 206 that represents available content, and a search engine layer 204 that operates to crawl and index content from the web layer 206, return search results in response to search queries, and record user clicks on search results to improve searching. Some embodiments of the present invention can be viewed as adding a new layer to the traditional search engine model. This can be seen in FIG. 3, which also includes a user layer 302, search engine layer 304, and web layer 308. A new layer 306 is provided between the search engine layer 304 and web layer 308. This new layer 306 may operate to, among other things, aggregate premium data about entities, organize the data for query session success and task completion, and provide joint optimization of search and data.

Figure 3:
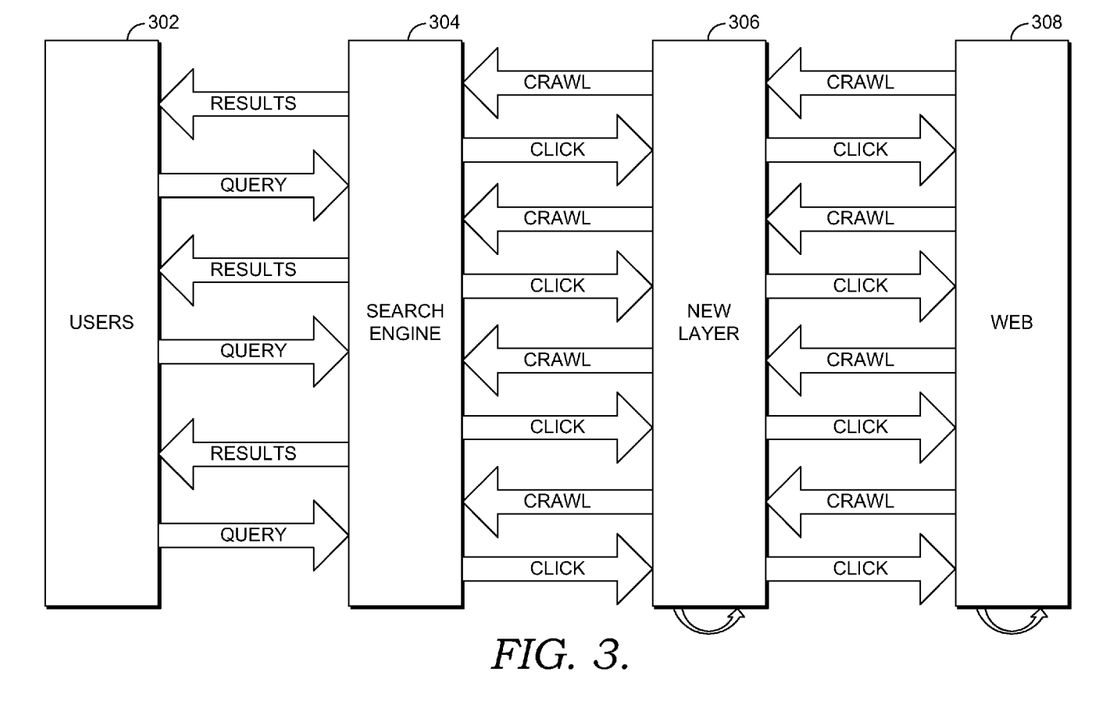
FIG. 3 is a diagram illustrating layers in a search engine service that includes a new layer in accordance with an embodiment of the present invention.

The new layer 306 may generally operate to leverage data from the search engine layer 304 to aggregate data from the web layer 308 and build entity pages for entities based on how users consume data at content sources for the entities. Because the search engine layer 304 connects users' intention (i.e., search queries) with information from content sources in the web layer 308, the search engine layer 304 may serve as a good source of information about how users consume data at the various content sources. For instance, a developer who creates a wiki page about an entity may not know what information about the entity users care most about so the wiki page content and layout may not be optimized for usage. However, the new layer 306 may leverage information available to the search engine layer 304 to generate an entity page for that entity based on content from the wiki page (and possibly other content sources) that address what users care most about on the wiki page. This may be determined, for instance, by analyzing query logs from the web layer 308 to identify what search queries users submit that lead the users to the wiki page. These search queries may represent the users' interests in the entity and how they have consumed data at the wiki page. Additionally or alternatively, the new layer 306 may identify how users have consumed data at content sources by leveraging information from the search engine layer 308 identifying questions and comments users have submitted on content sources for an entity in the web layer 308.

Figure 4:
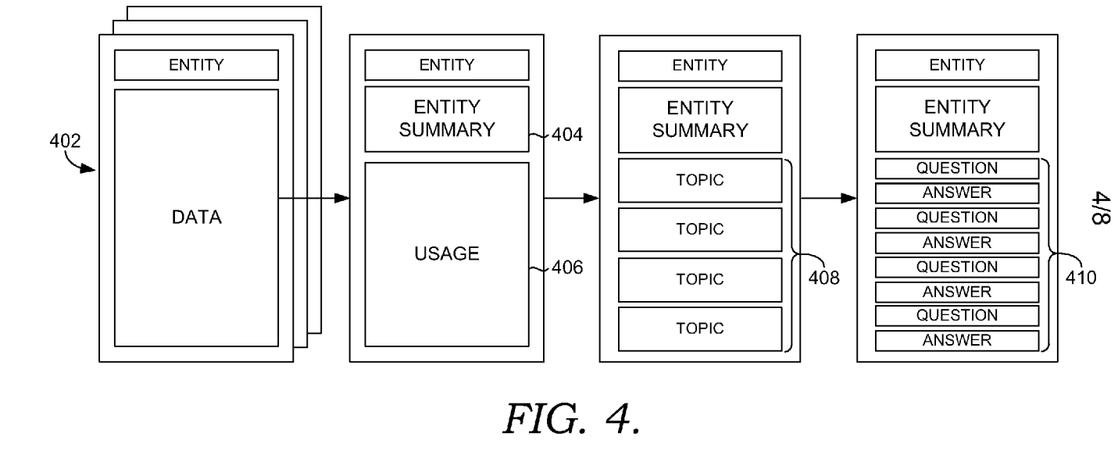
FIG. 4 is a block diagram providing an overview of entity page generation in accordance with an embodiment of the present invention.

FIG. 4 conceptually provides a brief overview of operations that may be employed by the new layer 306 to generate an entity page. Initially, content sources for an entity are identified and content 402 from the content sources is retrieved. The content sources may include any electronic document (e.g., web page, etc.) that may discuss the entity. Content 402 from the content sources is merged to generate an entity summary 404. The entity summary 404 may include a brief executive summary and/or more detailed summary information that may be presented in an encyclopedia/wiki-like fashion.

Usage data 406 is also identified for the entity. The usage data represents how users have consumed data at the content sources and what content has been of particular interest to users. As noted above, the usage data 406 may be derived based on search queries that led to the content sources and/or questions/comments submitted by users at content sources.

The usage data 406 is organized into a number of topics. 408. Each topic may include a topic title identifying the subject matter of the topic and topic content that provides information regarding the topic. In some instances, topics 408 may be converted into question and answer pairs 410. A topic may be converted into a question and answer pair by generating a question based on the topic title and/or user-submitted search queries/questions/comments for the usage data for the topic. Additionally, the answer for a question and answer pair may be generated based on the content for the topic.

An entity page is created that may include the entity summary 404 with any combination of topics 408 and question and answer pairs 410. The entity page may then be employed by a search engine to provide specific entity information in response to search queries. Because the topics 408 and/or question and answer pairs 410 are generated based on usage data, the entity page is configured based on what aspects of the entity users are interested in, and the entity page is better optimized for use by the search engine to address users' search queries regarding the entity.

Accordingly, in one aspect, an embodiment of the present invention is directed to one or more computer storage media storing computer-useable instructions that, when used by one or more computing devices, cause the one or more computing devices to perform operations. The operations include identifying a plurality of electronic content sources regarding an entity. The operations also include accessing usage data comprising information indicating how users have consumed data from the electronic content sources. The operations further include identifying a plurality of topics regarding the entity based on the usage data, accessing topic content for each of the topics, and generating a topic summary for each of the topics using the topic content. The operations still further include generating an entity page using the topic summary for each of the topics, and storing the entity page.

In another embodiment of the invention, as aspect is directed to a method performed by one or more processors. The method includes identifying a plurality of electronic content sources for an entity. The method also includes analyzing information from search engine query logs to identify a plurality of search queries that resulted in user selections of search results corresponding with the electronic content sources for the entity. The method further includes identifying a plurality of topics regarding the entity based on the plurality of search queries, and accessing content from the electronic content sources for the entity to generate a topic summary for each of the plurality of topics. The method still further includes generating an entity page for the entity that includes the topic summaries, and storing the entity page.

A further embodiment is directed to a system. The system includes one or more processors; and one or more computer storage media storing computer-useable instructions that, when used by the one or more processors, cause the one or more processors to: identify a plurality of electronic content sources for an entity; analyze search engine query logs to identify a plurality of search queries that resulted in user selections of search results corresponding with the electronic content sources; identify a plurality of user-submitted questions regarding the entity on the electronic content sources; identify a plurality of topics regarding the entity based on the plurality of search queries and the plurality of user-submitted questions; generate an entity page that includes the plurality of topics; store the entity page; receive a search query submitted by a user; analyze the search query to determine the search query is relevant to the entity; and provide information from at least a portion of the entity page for presentation to the user in response to the search query.

Figure 1:
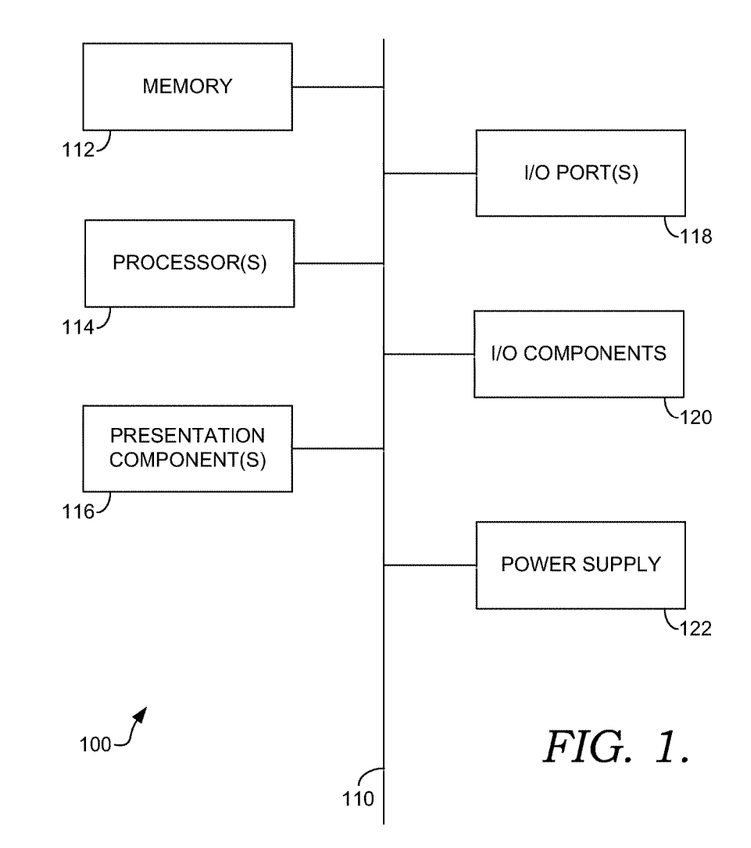
FIG. 1 is a block diagram of an exemplary computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc. The I/O components 120 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

Figure 5:
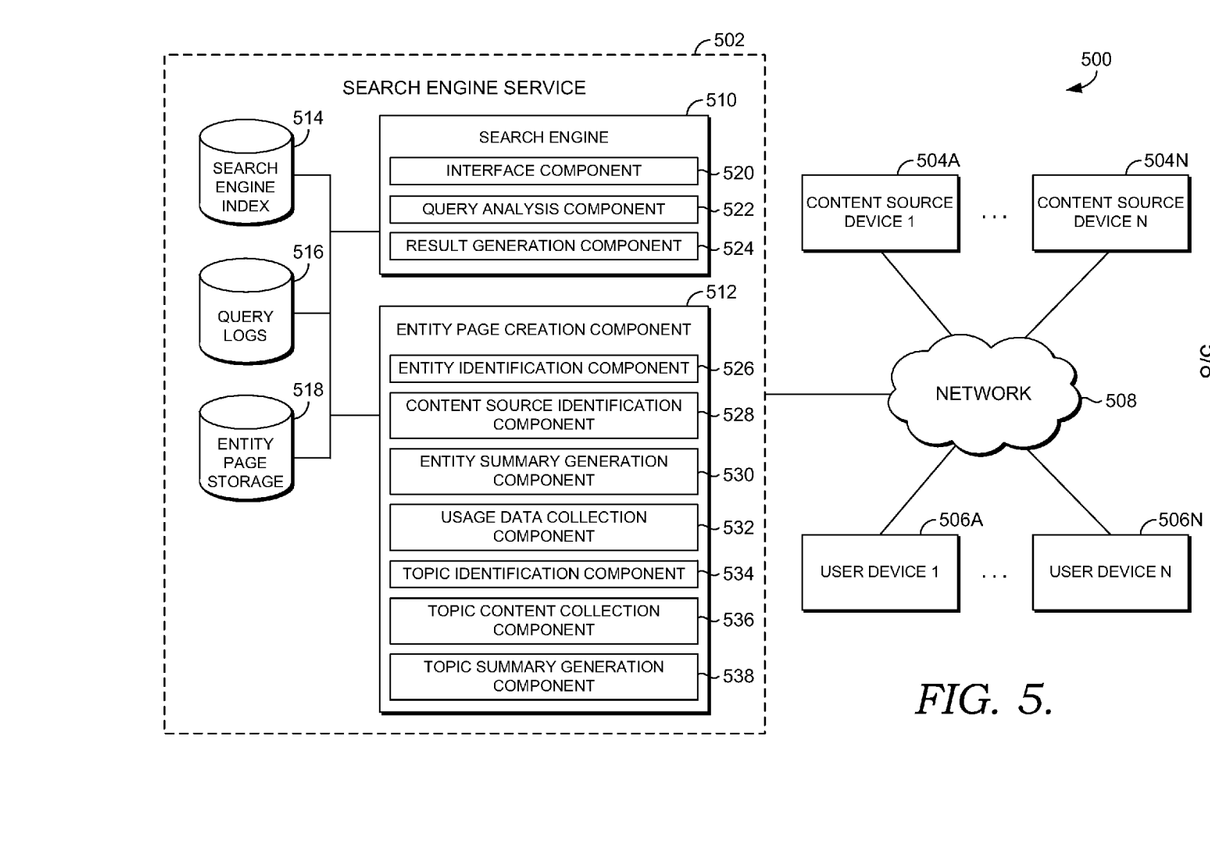
FIG. 5 is a block diagram of an exemplary system architecture in which embodiments of the invention may be employed.

Turning now to FIG. 5, a block diagram is provided illustrating an exemplary system 500 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 500 may include a search engine service 502, a number of content source devices 504A, 504N, and a number of user devices 506A, 506N. It should be understood that the system 500 shown in FIG. 5 is an example of one suitable computing system architecture. Each of the components shown in FIG. 5 may be implemented via any type of computing device, such as computing device 100 described with reference to FIG. 1, for example. The components may communicate with each other via a network 508, which may include, without limitation, one or more local area networks (LANs) and/or wide area networks (WANs). Such networking environments are commonplace in offices, enterprise-wide computer networks, intranets, and the Internet. It should be understood that any number of search engine services, content source devices, and user devices may be employed within the system 500 within the scope of the present invention. Each may comprise a single device or multiple devices cooperating in a distributed environment. For instance, the search engine service 502 may be provided via multiple devices arranged in a distributed environment that collectively provide the functionality described herein. Additionally, other components not shown may also be included within the network environment.

The search engine service 502 includes a search engine 510 that generally operates to access content at content source devices, such as the content source devices 504A, 504N. For instance, the search engine 510 may include a crawler (not shown) to crawl content source devices and index information from the content source devices in a search engine index 514. In some instances, content source devices may provide APIs that the search engine may employ to access data from the content sources. The content source devices may maintain a variety of content such as web pages and other electronic documents. For example, the content source devices may be web servers that maintain multiple web pages. Although only two content source devices are shown in FIG. 5, it should be understood that in practice, search engines, such as the search engine 510, typically index information from a large number of content sources.

By accessing and/or indexing information from various content source devices, the search engine 510 may provide search capabilities to user devices, such as the user devices 506A, 506N. For instance, a user may employ a web browser or other mechanism on a user device to communicate with the search engine 510. A user may issue a search query to the search engine 510 and receive search results. The search query may comprise one or more search terms, and the search engine 510 may provide search results that are relevant to those search terms. The search engine 510 may also store information regarding user searches in query logs 516. The query logs 516 may include, among other things, information regarding search queries submitted by users to the search engine 510, search results returned for each search query, and/or search results selected ("clicked") by users in response to each search query.

In accordance with embodiments of the present invention, the search engine service 502 also includes an entity page creation component 512. As shown FIG. 5, the entity page creation component 512 includes an entity identification component 526, a content source identification component 528, an entity summary generation component 530, a usage data collection component 532, a topic identification component 534, a topic content collection component 536, and a topic summary generation component 538. The entity page creation component 512 generally operates to identify entities, analyze usage data regarding how users have consumed data regarding each entity, and based on the analysis, generate an entity page for each entity that summarizes information regarding each entity based on how users have consumed data for each entity.

The entity identification component 526 may operate to identify entities for which entity pages are to be created. Entities may be identified by the entity identification component 526 in any of a variety of different manners within the scope of embodiments of the present invention. By way of example only and not limitation, entities may be automatically determined by analyzing search queries in the query logs 514 to identify entities being searched by users. Entities may also be determined using an existing entity knowledge repository (e.g., Microsoft's Satori knowledge repository) that tracks semantic information and relationships for entities. In further embodiments, entities may be manually identified or selected for the purpose of generating entity pages.

The content source identification component 528 operates to identify content sources for an entity. The content sources may generally include any electronic document and information regarding the entity that may be accessed by the search engine service 502. In some embodiments, the content source identification component 528 identifies premium content sources for an entity. The premium content sources are content sources that are deemed to have highly relevant and reliable content. By way of example only and not limitation, the premium content sources may include electronic encyclopedias or wikis (e.g., the WIKIPEDIA site), question and answer sites (e.g., the YAHOO ANSWERS site), business recommendation sites (e.g., the YELP site), product shopping and/or review sites (e.g., the AMAZON site), social networking sites (e.g., the FACEBOOK and TWITTER sites), and an entity's own website.

In some instances, query logs may be analyzed to identify content sources for an entity. Search queries containing the entity may be identified in the query logs, for instance, by analyzing the terms contained in the search queries. Web pages and other electronic documents returned in search results in response to those search queries may be relevant to the entity. Additionally, web pages and electronic documents selected by users from those search results may be considered relevant to the entity. In some instances, the web pages and other electronic documents that have been selected the most in search results by users may be deemed to be premium content sources for the entity.

The entity summary generation component 530 employs content from the content sources identified for the entity by the content source identification component 528 to generate an entity summary for the entity. Content from the various content sources is merged to generate the entity summary. This may include employing machine learning algorithms to determine what information to include from each content source and how to combine the information into a coherent summary for the entity. In some instances, all content from content sources is employed to generate the entity summary. In other instances, search result snippets that are generated when the content sources are provided as research results to search queries may be employed to generate the entity summary. The entity summary may include an executive summary providing a detailed but concise summary of important information about the entity. This may include basic information regarding the entity to satisfy basic user needs. The entity summary may also include more detailed information from the content sources that may be organized in an encyclopedia or wiki-like fashion.

The usage data collection component 532 operates to identify usage data for the entity. The usage data generally includes information regarding how users have consumed content from the content sources identified for the entity. The usage data may include any information indicative of what aspects of the entity are of particular interest to users and may be derived in a number of different ways from various sources. By way of example only and not limitation, usage data may be derived from the search engine's query logs 516. Generally, search queries submitted by users related to an entity are a good source of information regarding what aspects of the entity users are interested in. The query logs 516 may be analyzed to identify search queries for which the search results included one or more of the content sources for the entity and/or search queries for which users selected one or more of the content sources from the search results. A search query identified in this manner may then be examined to identify what aspect of the entity the user was interested in at the content source, for instance, by examining the terms used in the search query.

As an example to illustrate, suppose an entity page is being generated for the entity "Microsoft," and the website at www.microsoft.com (including all pages within that domain) has been identified as a content source for the entity. The query logs 514 may be analyzed to identify search queries that returned search results corresponding with web pages within the microsoft.com domain and/or search queries that included user selections of search results corresponding with web pages within that domain. Suppose further that one search query identified in this manner includes: "customer service phone number for Microsoft." The usage data collected from this example search query may be the user interest in the customer service number for the entity "Microsoft."

Another source of usage data for an entity may be questions and comments submitted by users within content sources for the entity. For instance, usage data for any entity may be found on question and answer sites. In particular, questions submitted by users regarding an entity may be indicative of what aspects of the entity users are interested in. For instance, a question on a question and answer site may ask: "what time does Yellowstone open." This question could be identified as being associated with the entity "Yellowstone National Park" and the aspect of the entity the user is interested in this example would be the opening time for the entity. As another example, usage data may also be derived from social messages posted using social networking services. For instance, users may ask questions or otherwise discuss topics regarding an entity via social networking messages (e.g., FACEBOOK posts, TWITTER tweets, etc.). Aspects of an entity that are relevant to the users may therefore be mined from these social networking messages. Further, questions and comments submitted by users on business recommendation sites (e.g., the YELP site), product shopping and/or review sites (e.g., the AMAZON site), and blog sites, to name a few, may be employed as usage data. As noted above, any information that is indicative of what aspects of an entity users are interested in may be collected as usage data for the entity. The above-provided sources of usage data are provided by way of example only and not limitation. A variety of other sources may be mined to identify usage data for an entity.

The topic identification component 534 analyzes the usage data to determine the top topics for the entity. These are the topics users care most about the entity based on the usage data collected by the usage data collection component 532. Any number of topics may be selected as the top topics for the entity. In some instances, a fixed number of topics may be selected for each entity. In other instances, the number of topics may vary among entities based on, for instance, the number of topics identified for each entity and the popularity of those topics.

The top topics may be determined in a variety of different manners within the scope of embodiments of the present invention. By way of example only and not limitation, machine learning algorithms or clustering techniques may be used to cluster usage data into a variety of different topics based on the content of the usage data. Additionally, the topics may be ranked, and top topics for the entity may be identified based on the ranking. Topics may be ranked using any of a variety of different inputs. Generally, any information indicative of popularity of a topic may be used for ranking purposes. This information may include, for instance, the number of unique pieces of usage data (e.g., number of search queries, questions, comments, etc.) clustered for a topic. Search engine signals may also be employed for ranking purposes. For instance, source content that receives more user clicks in search results may be considered more popular and may improve the ranking of topics associated with that source content. Social media signals may also be used for ranking purposes. For instance, the number of retweets for a TWITTER message or the number of "likes" or comments for a social networking message may be indicative of the popularity of the message. Further, the number of replies to a question at a question and answer site may be indicative of the popularity of the topic associated with the question. Any and all such combinations and modifications thereof are contemplated to be within the scope of embodiments of the present invention.

The topic content collection component 536 operates to gather the content for each of the top topics identified by the topic identification component 534. In some instances, the usage data may include the topic content already and no additional content is needed. However, in other instances, the usage data may only include information such as questions asked by users and not the actual answers that would serve as the content for the topics included in the questions. In such instances, the content sources may be analyzed to identify content that addresses an identified topic. For example, if one of the top topics for the entity "Yellowstone National Park" is the opening hours for the Yellowstone National Park, content sources for the Yellowstone National Park (e.g., the park's official website, a WIKIPEDIA page for the park, etc.) may be analyzed to identify the hours for the park. In some instances, one content source may provide content for a topic. In other instances, content for a topic may be derived from multiple content sources.

The topic summary generation component 538 generates a topic summary for each of the top topics. Each topic summary includes content addressing a particular topic. Additionally, a topic summary may identify the content source(s) from which the content for the topic was derived. This may include a single content source or multiple content sources.

In some instances, a topic may be converted into a question and answer pair, which may be more user-friendly. In particular, it is often easier for many users to consume data about an entity in a question and answer format. Converting a topic into a question and answer pair may be performed by generating a question for the topic. This may be done, for instance, by generating a question based on a topic title. For example, an example topic title may be "Yellowstone National Park's operating hours." Based on this topic title, a question may be generated, such as "What are the operating hours for Yellowstone National Park?" In some instances, a question for a topic may be machine generated based on a topic title. In other instances, a question for a topic may be derived from a question originally submitted by a user and found from a content source for the entity (e.g., a search query found in the query logs, a question submitted at question and answer site, a question submitted in a social networking message, etc.). This may be useful as the most natural question usually comes from a user (as opposed to being machine generated). In addition to generating a question, an answer may be determined for the question and answer pair. In particular, the answer may be generated from the content for the topic. Continuing the example above, the answer for the question "What are the operating hours for Yellowstone National Park?" would be the operating hours for Yellowstone National Park, which may have been derived from one or more content sources. The answer may be generated to identify the content source (s) used to generate the content of the answer.

An entity page for the entity is created using the entity summary generated by the entity summary generation component 530 and the topic summaries for the top topics for the entity generated by the topic summary generation component 538. The topic summaries for the top topics may be ordered on the entity page based on the popularity ranking for each topic. The entity page may then be stored in an entity page storage 518, which may include entity pages generated for various entities by the entity page creation component 512.

The entity pages may be employed by the search engine 510 when returning results to user search queries. In many instances, information from the entity pages may directly address the search queries and users may not need to resort to any other search results or other sources of information. As shown in FIG. 5, the search engine 510 provided by the search engine service 502 includes an interface component 520, which may be configured to receive search queries submitted by users from user devices, such as the user devices 504A, 504N.

When a search query is received, the search query is analyzed by a query analysis component 522. The query analysis component 522 examines the search query to determine if the query is relevant to a particular entity. For instance, a search query that contains "yellowstone park" may be analyzed to identify that the query is relevant to the entity "Yellowstone National Park." Additionally, the query analysis component 522 may determine if the search query is also directed to a particular topic for an entity. In some instance, it may be determined that a search query does not refer to any topics for an identified entity. For example, the search query "yellowstone park" may be determined to be related to the entity "Yellowstone National Park" but not refer to any topics regarding that entity. In other instances, it may be determined that the search query does refer to a particular topic for the identified entity. For example, a search query that contains "yellowstone park hours" may be analyzed to identify that the query is relevant to the entity "Yellowstone Nation Park" and is also directed to the operating hours topic for that entity. Entity and topic identification may be performed, for instance, by analyzing the terms contained in a search query and comparing those against known entities and topics.

The result generation component 524 generates search results to return in response to a search query. The result generation component 524 may retrieve content from an entity page based on an identification of an entity and/or topic by the query analysis component 522. If the query analysis component 522 identifies only an entity and not a topic in the search query, general information regarding the entity may be retrieved from the entity page and returned to the user who submitted the search query. This may include, for instance, the entity summary or a portion of the entity summary (e.g., an executive summary) created by the entity summary generation 530 and the top topics or a portion of the top topics generated by the topic summary generation component 538. In some instances, the entire entity page may be returned. The entity information may be provided by itself or may be provided with other search results identified for the query. In some instances, search results are provided on a left pane of a search results page and entity information from the entity page is provided on a right pane of the search results page.

Alternatively, if the query analysis component 522 identifies an entity and a topic, the topic summary for the identified topic may be retrieved from the entity page and provided as a search result in response to the search query. In some instances, other information, such as the executive summary, from the entity page may also be provided with the topic summary. The topic summary may be provided as a definitive answer to the search query, as a question and answer pair to address the search query, or as a rich caption. As noted above, the information retrieved from the entity page may be provided alone or in combination with other search results. Additionally, the entity information from the entity page may be located anywhere on a search results page in conjunction with other search results.

In some embodiments, the entity page storage 518 may only be accessible by the search engine service 502 as discussed above. In other embodiments, the entity page storage 518 may be publicly available. This may include providing each entity page as a web page with a particular URL, which allows users to navigate directly to entity pages. This may also allow other search engines (e.g., providing by other third-party search engine providers) to crawl and index information regarding the entity pages, so those search engines may provide search results that include information regarding the entity pages when users submit search queries to those other search engines.

Figure 6:
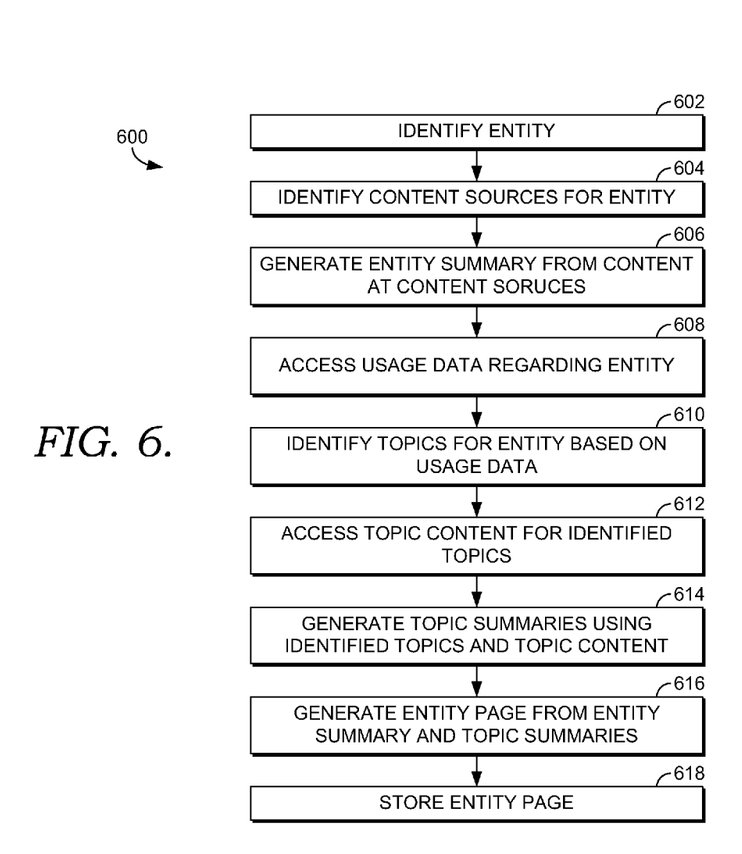
FIG. 6 is a flow diagram showing a method for generating an entity page in accordance with an embodiment of the present invention.

With reference now to FIG. 6, a flow diagram is provided that illustrates a method 600 for generating an entity page in accordance with an embodiment of the present invention. Initially, as shown at block 602, an entity is identified. The entity may be manually identified by a search engine service's personnel or automatically identified, for instance, based on an existing listing of entities, or otherwise using an approach for algorithmically determining entities for which entity pages will be generated.

Content sources for the entity are identified, as shown at block 604. Generally, any electronic document or information that discusses the entity and is accessible to a search engine service may be identified as a content source. In some embodiments, only premium content sources from known websites are selected as content sources for an entity as the premium content sources may be deemed to have highly relevant and reliable information.

An entity summary is generated based on content from the content sources, as shown at block 606. This may include processing the information from the content sources to create a coherent summary of the entity. In some instances, a short summary (e.g., executive summary) may be generated and/or detailed information may be generated in an encyclopedia/wiki-like fashion.

Usage data for the entity is accessed at block 608. The usage data comprises information regarding how users have consumed data at the content sources for the entity. This information is indicative of what aspects of the entity at the content sources are of particular interest to users. The usage data may be accessed, in some instances, from a search engine's query logs by identifying search queries that resulted in search results corresponding with the content sources and/or search results selected by users that correspond with the content sources. Those identified search queries can be considered to be indicative of what aspects of the content sources are of interest to users and how users have consumed the data at the content sources. Additional sources of usage data may be questions and comments submitted by users within the contents sources, such as questions and comments submitted on question and answer sites, social networking services, business recommendation sites, product shopping/review sites, and/or blogs, for instance.

Topics for the entity are identified based on the usage data, as shown at block 610. Generally, this may include clustering usage data into different groups based on the content (i.e., text) of the usage data. For instance, a number of search queries that resulted in selection of a search result corresponding with the Yellowstone National Park website may have had various terms associated with the hours of operation for the park. Based on the terms included in those search queries, the search queries may be grouped into a cluster and identified as a topic corresponding with the hours of operation for the Yellowstone National Park. The various topics identified for the entity may also be ranked based on information indicative of the popularity of each of the topics. Based on the topic rankings, a top N number of topics may be selected for the entity.

Topic content is accessed for each of the topics, as shown at block 612. In some instances, the usage data may include the topic content. In other instances, the usage data may only identify a topic and topic content may be retrieved from the content sources. Topic summaries are generated for each identified topic using the retrieved topic content, as shown at block 614. In some instances, the topic summary may include a topic title (i.e., what the topic is generally about) and topic content (i.e., the actual information for the topic). In some embodiments, the topic summary may be provided as a question and answer pair. A question and answer pair may be generated by converting a topic title into a question or identifying a user-submitted question for the topic and providing the topic content as the answer. An entity page is generated from the entity summary and topic summaries, as shown at block 616. The topic summaries may be ordered on the entity page based on the popularity rankings for the topics. The entity page is stored, as shown at block 618.

The process of generating an entity page or portions of that process may be periodically repeated to replace or update the entity page. This may include updating the topics included within the entity page based on changes in usage data for the content sources. Accordingly, as user interests in the entity change over time, the entity page may be updated such that it reflects the users' current interests in the entity. Additionally, new content sources may be identified for the entity and used in updating the entity page.

Figure 7:
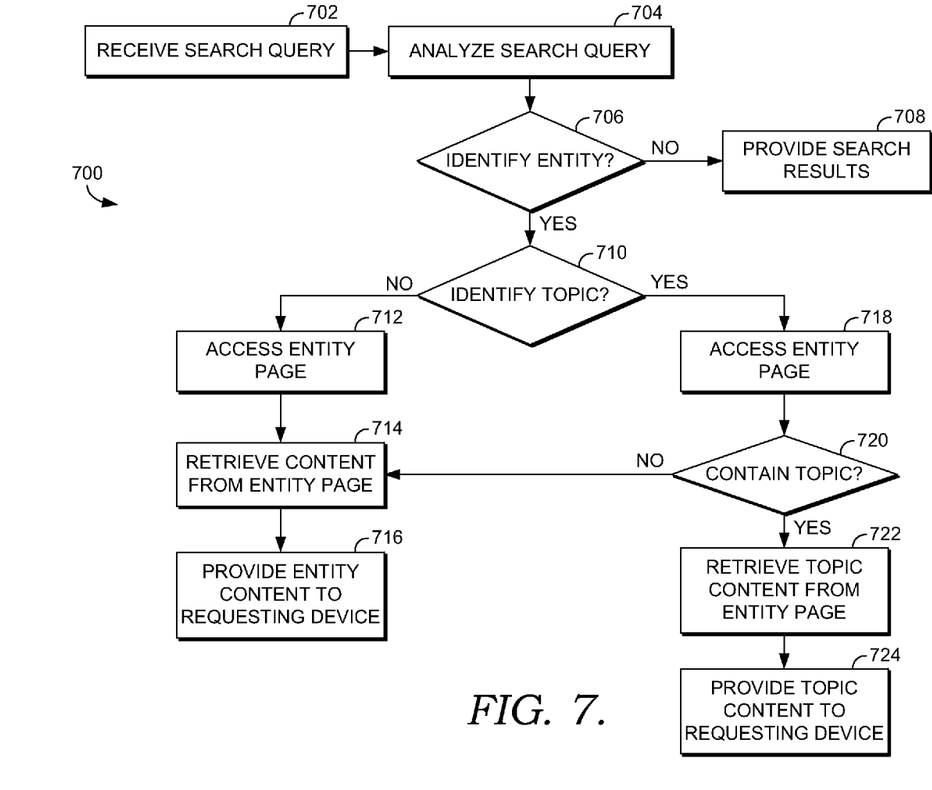
FIG. 7 is a flow diagram showing a method for returning a search result in response to a search query in accordance with an embodiment of the present invention.

Turning now to FIG. 7, a flow diagram is provided that illustrates a method 700 for providing information from an entity page in response to a search query. As shown at block 702, a search query is received. The text of the search query is analyzed at block 704 to determine if the search query is related to a particular entity and, if so, a particular topic regarding the entity. Accordingly, a determination is made at block 706 regarding whether the search query is related to a particular entity. If not, no entity information is retrieved from an entity page and search results are simply retrieved based on the search query and returned, as shown at block 708.

Alternatively, if an entity is identified, a determination is made at block 710 regarding whether the search query is directed to a particular topic of the identified entity. If not, the entity page for the identified entity is accessed at block 712, and general content from the entity page is accessed from the entity page at block 714. This may include the entire entity page or only portions of the entity page (e.g., an executive summary and topic titles). The entity content from the entity page is provided in response to the search query, as shown at block 716. In some instances, only information from the entity page is provided in response to the search query. In other instances, information from the entity page is provided with other search results retrieved by the search engine.

If it is determined that the search query is directed to a particular topic for the entity at block 710, the entity page is accessed at block 718 and a determination is made at block 720 regarding whether the entity page contains the identified topic from the search query. If not, general content from the entity page is retrieved and provided, as shown at blocks 714 and 716. Alternatively, if the entity page contains the topic identified from the search query, topic content for that topic is retrieved from the entity page, as shown at block 722. The retrieved topic content from the topic page is provided in response to the search query, as shown at block 724. In some instances, the topic content from the topic page may be provided by itself. In other instances, the topic content may be provided with other content from the entity page and/or with other search results retrieved based on the search query. The topic content may be presented in a number of different formats, such as a definitive answer to the search query, as a question and answer pair addressing the search query, and/or as a rich caption search result.

Figure 8:
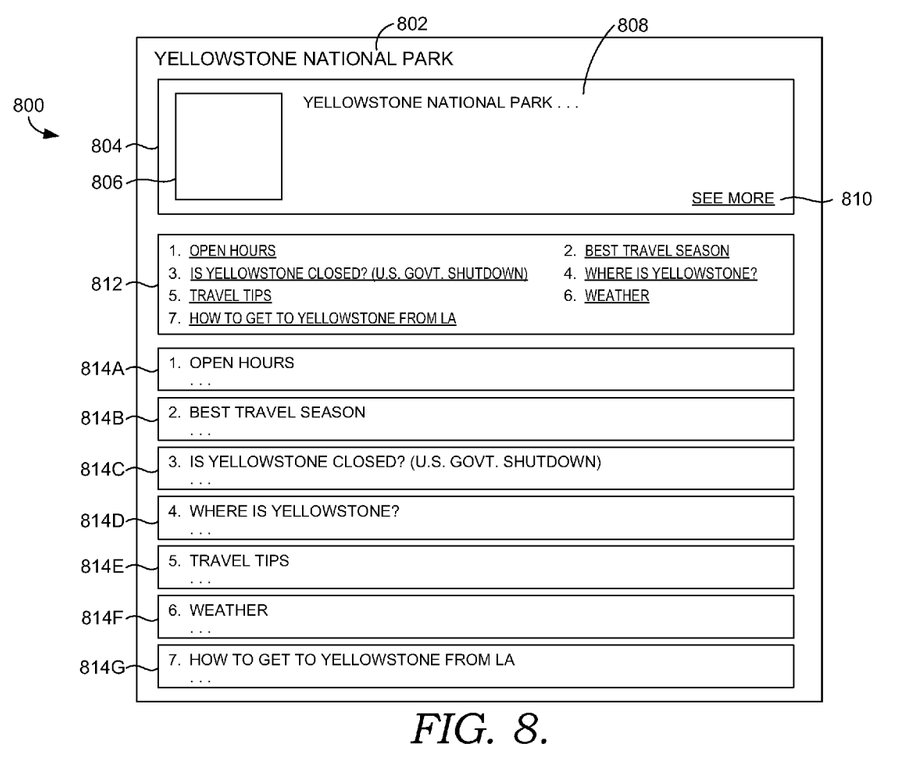
FIG. 8 is a screenshot showing an entity page in accordance with an embodiment of the present invention.

FIG. 8 provides a screenshot of an example entity page 800 generated in accordance with some embodiments of the present invention. As shown in FIG. 8, the entity page 800 includes a title 802 identifying the entity. In the present example, the entity page 800 is directed to the entity "Yellowstone National Park." The entity page 800 includes an entity summary section 804 that includes summary information for the entity generated by merging content from the various content sources identified for the entity. In the present example, the entity summary section 804 includes an image 806 and an executive summary 808 providing a short summary of the entity. Additionally, a "SEE MORE" option 810 is provided that allows a user to access more detailed entity summary for the entity that was prepared based on content from the content sources for the entity. The more detailed entity summary may be presented in an encyclopedia/wiki-like fashion with different sections addressing different aspects of the entity in detail.

The entity page 800 also includes a topic summary section 812. The topic summary section 812 identifies each of the top topics determined for the entity based on usage data indicative of how users have consumed content at the content sources for the entity. In the present example, seven topics have been identified for the entity. Topic sections 814A-814G are provided on the entity page 800 for the seven topics. Each of the topic sections 814A-814G include topic content for the topics. In some instances, a topic summary may be provided with a topic title and topic content. In other instances, a topic summary may be provided as a question and answer pair. The topic summary may identify one or more content sources at which the topic content was retrieved. A link to those content sources may be provided within the topic summaries to allow users to navigate directly to those content sources, if desired. Each topic summary may also include trending information regarding how the popularity of that topic is trending among users. As noted above, the process of analyzing usage data may be periodically repeated over time. This may provide a history of topic popularity that indicates how the popularity of each topic has changed over time.

As can be understood, embodiments of the present invention provide entity pages optimized for searching based on how users consumer data at content sources for entities. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations for a search engine to generate an entity page with information regarding an entity, the operations comprising:

accessing usage data comprising information indicating how a plurality of users have consumed data from electronic content sources identified as content sources for an entity, the usage data including at least one of search query data, question data, and comment data, the search query data comprising search queries that resulted in one or more of the electronic content sources as search results, the question data comprising questions submitted on one or more of the electronic content sources, and the comments data comprising comments submitted on one or more of the electronic content sources;

identifying a plurality of topics regarding the entity by analyzing the search queries and/or questions or comments from the usage data, each topic from the plurality of topics corresponding to an aspect of the entity;

generating a topic summary for each of the topics using topic content accessed for each of the topics, the topic summary for each of the topics comprising information addressing the aspect of the entity corresponding to the topic;

generating an entity page identifying each of the topics and including the topic summary for each of the topics;

storing the entity page at a data store of the search engine;

receiving a search query submitted by a user;

analyzing the search query to determine the search query is directed to a first topic from the plurality of topics regarding the entity, the first topic corresponding to a first aspect of the entity;

retrieving information from the topic summary for the first topic included in the topic page, the topic summary of the first topic comprising information addressing the first aspect of the entity; and providing the information in response to the search query for presentation to the user.

2. The one or more computer storage media of claim 1, wherein the electronic content sources comprise premium content sources including at least one selected from the following: an encyclopedia site, a question and answer site, a social networking service, a business review site, and a product shopping or review site.

3. The one or more computer storage media of claim 1, wherein accessing the usage data regarding the entity and identifying the topics regarding the entity based on the usage data comprises:

analyzing search engine query logs to identify search queries that resulted in user selections of search results corresponding with at least one of the electronic content sources; and identifying at least a portion of the topics based on the identified search queries.

4. The one or more computer storage media of claim 1, wherein accessing the usage data regarding the entity and identifying the topics regarding the entity based on the usage data comprises:

identifying questions regarding the entity submitted by users on at least one selected from the following: a question and answer site, a social networking service, a business review site, and a product shopping or review site; and identifying at least a portion of the topics based on the identified questions.

5. The one or more computer storage media of claim 1, wherein identifying the plurality of topics regarding the entity based on the usage data comprises:

clustering usage data into a plurality of clusters; and
   identifying a topic for each cluster.

6. The one or more computer storage media of claim 5, wherein identifying the plurality of topics comprises ranking topics based on popularity information determined for each topic and selecting a set of topics as the plurality of topics based on the rankings.

7. The one or more computer storage media of claim 1, wherein the topic summary for the first topic comprises a question and answer pair.

8. The one or more computer storage media of claim 1, wherein the operations further comprise:

generating an entity summary based on information from the electronic content sources; and wherein the entity page includes the entity summary.

9. A method, performed by one or more processors of a search engine, to generate an entity page with information regarding an entity, the method comprising:
- analyzing information from search engine query logs stored by the search engine to identify a plurality of search queries from a plurality of users that resulted in user selections of search results corresponding with electronic content sources identified as content sources for an entity;
- identifying a plurality of topics regarding the entity based on the plurality of search queries, each topic from the plurality of topics corresponding to an aspect of the entity;
- accessing content from the electronic content sources for the entity to generate a topic summary for each of the plurality of topics, the topic summary for each of the topics comprising information addressing the aspect of the entity corresponding to the topic;
- generating an entity page for the entity that identifies each of the topics and includes the topic summary for each of the topics;
- storing the entity page at a data store of the search engine;
- receiving a search query submitted by a user;
- analyzing the search query to determine the search query is directed to a first topic from the plurality of topics regarding the entity, the first topic corresponding to a first aspect of the entity;
- retrieving information from the topic summary for the first topic included in the topic page, the topic summary of the first topic comprising information addressing the first aspect of the entity; and
- providing the information in response to the search query for presentation to the user.

10. The method of claim 9, wherein identifying the plurality of topics regarding the entity based on the plurality of search queries comprises:
- clustering search queries into a plurality of clusters; and
- identifying a topic for each cluster.

11. The method of claim 10, wherein identifying the plurality of topics comprises ranking topics based on popularity information determined for each topic and selecting a set of topics as the plurality of topics based on the rankings.

12. The method of claim 9, wherein the topic summary for the first topic comprises a question and answer pair.

13. The method of claim 9, wherein the operations further comprise:
- generating an entity summary based on information from the electronic content sources; and
- wherein the entity page includes the entity summary.

14. A system comprising:
- one or more processors of a search engine; and
- one or more computer storage media storing computer-useable instructions that, when used by the one or more processors, cause the one or more processors to:
- analyze search engine query logs stored by the search engine to identify a plurality of search queries from a plurality of users that resulted in user selections of search results corresponding with electronic content sources identified as content sources for an entity;
- identify a plurality of user-submitted questions regarding the entity on the electronic content sources;
- identify a plurality of topics regarding the entity based on the plurality of search queries and the plurality of user-submitted questions, each topic from the plurality of topics corresponding to an aspect of the entity;
- generate an entity page that includes the plurality of topics and topic content for each of the topics, the topic content for each of the topics comprising information addressing the aspect of the entity corresponding to the topic;
- store the entity page at a data store of the search engine;
- receive, at the search engine, a search query submitted by a user;
- analyze the search query to determine the search query is relevant to a first topic of the entity, the first topic corresponding to a first aspect of the entity; and
- provide information from the topic content for the first topic on the entity page for presentation to the user in response to the search query, the topic content for the first topic comprising information addressing the first aspect of the entity.

15. The system of claim 14, wherein identifying the plurality of topics regarding the entity based on the plurality of search queries and the plurality of user-submitted questions comprises:
- clustering search queries and user-submitted questions into a plurality of clusters; and
- identifying a topic for each cluster.

* * * * *